United States Patent [19]

Masuda et al.

[11] Patent Number: 4,564,905
[45] Date of Patent: Jan. 14, 1986

[54] TRIP COMPUTER FOR VEHICLES

[75] Inventors: Mitsuhiro Masuda; Shotaro Naito; Keiichi Tokuyama; Shizuhisa Watanabe, all of Katsuta, Japan

[73] Assignee: Hitachi, Ltd., Tokyo, Japan

[21] Appl. No.: 505,440

[22] Filed: Jun. 17, 1983

[30] Foreign Application Priority Data

Jun. 18, 1982 [JP] Japan ................................ 57-103853

[51] Int. Cl.⁴ ............................................ G06F 15/50
[52] U.S. Cl. .................................. 364/424; 364/442; 73/114
[58] Field of Search ............... 364/424, 442, 444, 561, 364/565; 73/113, 114; 377/21, 24; 340/994

[56] References Cited

U.S. PATENT DOCUMENTS

| 4,217,644 | 8/1980 | Kato et al. | 364/442 |
| 4,344,136 | 8/1982 | Panik | 364/424 |
| 4,400,779 | 8/1983 | Kosuge et al. | 364/442 |
| 4,462,079 | 7/1984 | Ito et al. | 364/442 |

FOREIGN PATENT DOCUMENTS 57-139621  8/1982  Japan .................................. 364/424

Primary Examiner—Gary Chin
Attorney, Agent, or Firm—Antonelli, Terry & Wands

[57] ABSTRACT

A vehicle trip computer for detecting the distance traveled by a vehicle and the amount of fuel remaining in the fuel tank and computing and displaying the capable travel distance of the vehicle through the desired computational operations in accordance with the detected data. During the initial period following the connection of the trip computer to the power source, the capable travel distance of the vehicle is computed by using a predetermined initial gas mileage in place of the computed gas mileage. Also, the trip computer does not replace the initial gas mileage with the computed actual gas mileage until the distance traveled by the vehicle exceeds a predetermined distance.

3 Claims, 5 Drawing Figures

TRIP COMPUTER FOR VEHICLES

BACKGROUND OF THE INVENTION

The present invention relates to trip computers for vehicles and more particularly to a trip computer which is capable of computing a capable travel distance suitably even just after having connected the trip computer to the vehicle battery by turning on the key switch suitably.

Apparatus heretofore known as automobile trip computers or drive computers have a function of computing a capable travel distance as a predicted information and it is derived by the following calculation.

(gas milage) × (residual fuel amount) = capable travel distance.

However, there is a disadvantage that if this data is not satisfactorily accurate, the computation of a capable travel distance results in a value which differs considerably from the correct value. It has been the usual practice to compute the gas mileage in the following manner due to the inability to directly input the data which is necessary for computation:

$$\frac{\text{Traveled Distance}}{\text{Consumed Amount}} = \text{Gas Mileage}$$

However, where the totalized data, e.g., the traveled distance and the consumed fuel amount are small, the effect of this totalized or integrated data is lost so that due to the running conditions, etc., there is the danger of the resulting gas mileage value being varied suddenly and impeding the computation of a capable travel distance. Usually, the traveled distance and the consumed fuel amount are stored as data in the RAM of a microcomputer so that even if the key switch is turned off, at least because of the data holding function there is no danger of the various data being cleared or destroyed. However, problems will be caused if the microcomputer in the deenergized condition is again connected to the power source. For instance, if the automobile is garaged or when the battery is removed, there is a disadvantage that at the instant the microcomputer is again connected to the battery, the microcomputer will be reset thus clearing the data (the traveled distance and the consumed fuel amount) in the RAM altogether and that until the time that the necessary parameters are increased satisfactorily after the start of the automobile the computed gas mileage value will be caused to vary considerably thus failing to ensure the desired computation accuracy of the capable travel distance.

SUMMARY OF THE INVENTION

It is therefore the primary object of the present invention to provide a trip computer capable of computing the desired capable travel distance as highly accurate predicted information.

Thus, in accordance with the present invention the computation of gas mileage is performed stably thus improving the accuracy of the resulting capable travel distance and stabilizing the greatly fluctuating portion of the gas mileage. In other words, during the initial stage of the computation the gas mileage fluctuates considerably due to the small values of the parameters. As a result, during the initial stage of the counting the gas mileage is not used but a substitution value is used as the necessary gas mileage value so as to compute the desired capable travel distance, that is, the gas mileage is replaced with a substitute gas mileage when it is unstable and the gas mileage is utilized as such when it is stable thereby improving the accuracy of the resulting capable travel distance.

Note that what is meant by the unstable gas mileage is one derived during a given period after the connection of the power source. In accordance with the results of the actual car tests, this unstable period is estimated as 50 km at the maximum in terms of traveled distance so that a predetermined value is used as the gas mileage during the said interval and the actual gas mileage is computed only after the traveling of 50 km. While the predetermined gas mileage value must be varied depending on the type of automobile, it is considered proper that the average gas mileage under the ordinary running conditions, e.g., 13 km/l is used for this purpose. By making these settings by means of software, it is possible to compute the desired capable travel distance without any rapid variation of the gas mileage and thereby improve the accuracy.

DESCRIPTION OF THE DRAWINGS

The present invention will be apparent from the detailed description taken in conjunction with the accompanying drawings, in which.

DETAILED DESCRIPTION OF A PREFERRED EMBODIMENT

Figure 1:
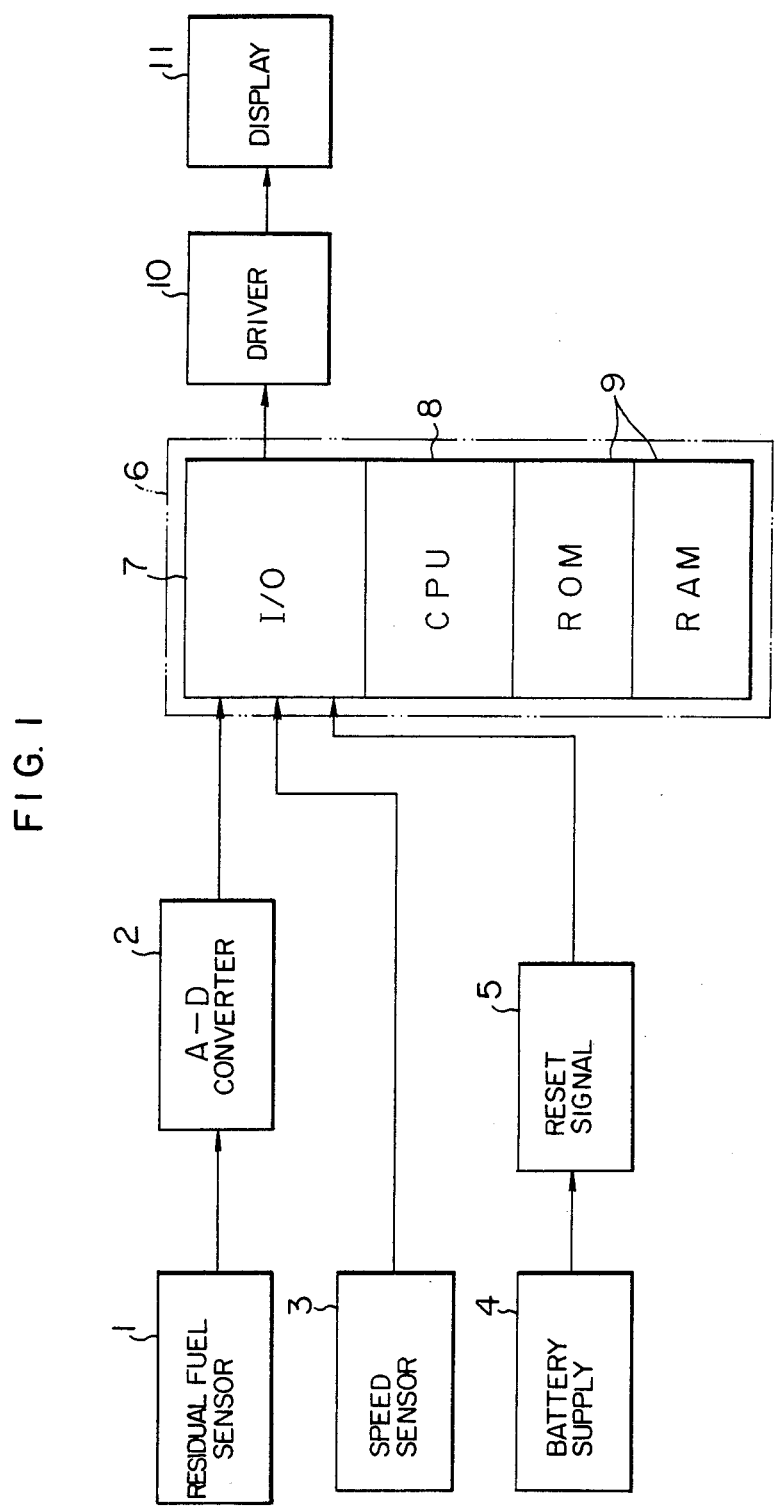
FIG. 1 is a block diagram showing the construction of a hardware section of an embodiment of the invention.

FIG. 1 shows an embodiment of the invention. In the Figure, a 4-bit microcomputer 6 includes an interface I/O 7, a computation control CPU 8 and a memory unit ROM.RAM 9 which are contained in one chip, and the I/O unit 7 is constructed so that the potentiometer value generated from a residual fuel sensor 1 is introduced through an A/D converter 2. Also, the I/O unit 7 receives the output pulses from a vehicle speed sensor 3 and the reset signal generated from a reset signal generating circuit 5 when a battery supply 4 is connected to the microcomputer 6.

Also, a display unit 11 is connected to the I/O unit 7 through a driver circuit 10. The driver circuit 10 and the display unit 11 form an output system.

With the construction described above, the microcomputer 6 is first connected to the battery and the power is supplied to it from the battery. In response to the battery power, the reset signal generating circuit 5 is operated first and a reset signal is generated. This reset signal resets the microcomputer 6 thereby effecting the initialization. When the initialization is effected in response to the reset signal, an initial gas mileage of 13 km/l, for example, (this value varies depending on the type of engine) is stored in the gas mileage area of the RAM 9. Thereafter, each time a vehicle speed pulse is inputted from the vehicle speed sensor 3, it is counted up and stored in the traveled distance area of the RAM 9. Also, at intervals of 100 seconds, the residual fuel amount is inputted from the residual fuel sensor 1 so that the CPU 8 performs the operations of calculating the consumed amount from the counted value and changing the data in the residual amount and consumed amount areas of the RAM 9. Then, the previously-mentioned initial gas mileage is used in the computation until the value in the traveled distance area of the RAM 9 reaches 50 km, and after the value has exceeded 50 km the following calculation is performed at intervals of 100 seconds thereby changing the data in the gas mileage area of the RAM 9

$$\frac{\text{(Traveled Distance)}}{\text{(Consumed Amount)}} = \text{(Gas Mileage)}.$$

On the other hand, the data is fetched from the gas mileage area and the residual amount area of the RAM 9 and subjected to multiplication by the CPU 8 so that the value of the resulting capable travel distance is stored in the RAM 9 and it is also loaded into the driver circuit 10 thereby operating the display unit 11.

Figure 2A:
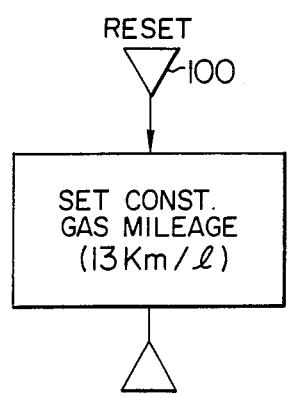
FIGS. 2(A) to 2(C) are flow charts for the computation of a capable travel distance.
Figure 2B:
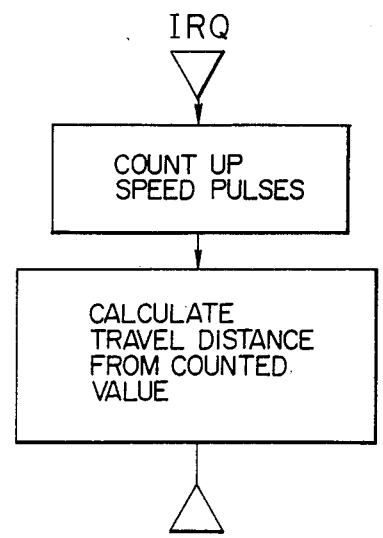
Figure 2C:
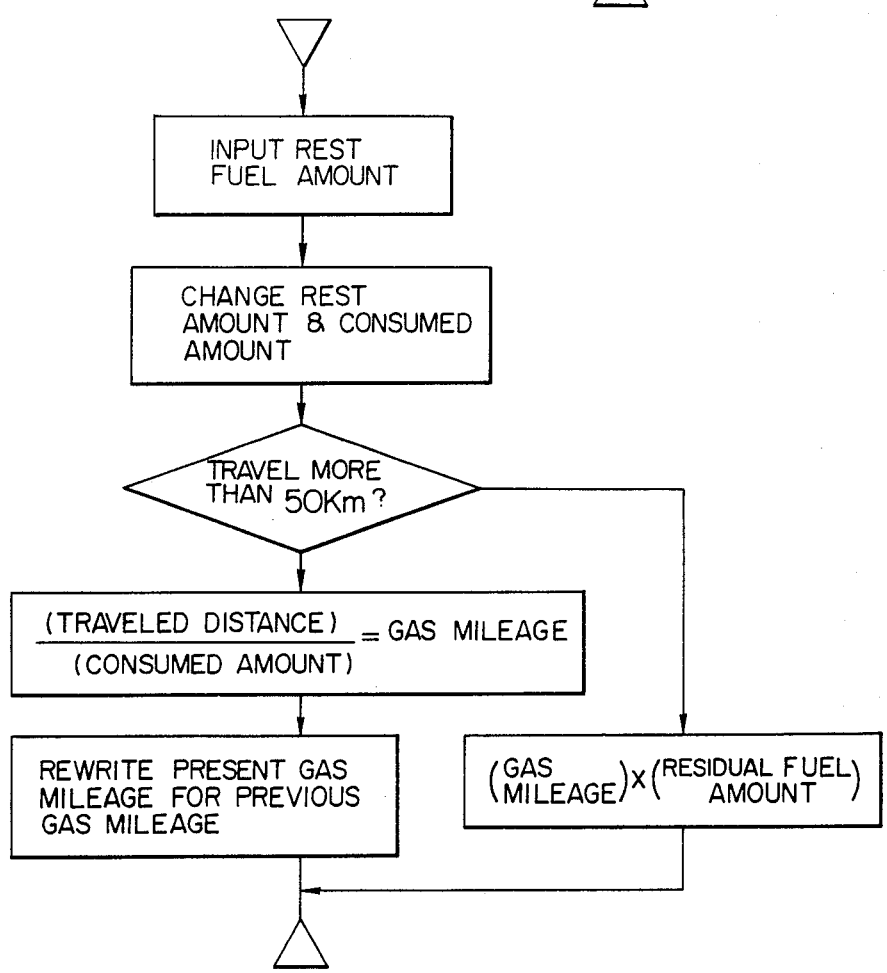

FIGS. 2(A) to 2(C) show a traveled distance computing flow chart and a capable travel distance flow chart.

FIG. 2(A) shows the flow chart for the operations performed in response to the connection of the microcomputer 6 to the power supply. More specifically, when a reset signal is received by a step 100, the initialization is effected and the program is started. Then, a step 101 sets a constant value, e.g., 13 km/l as an initial gas mileage in the gas mileage area of the RAM 9.

FIG. 2(B) shows the traveled distance computing flow chart responsive to the pulse signal from the speed sensor 3. More specifically, when a step 200 causes an interrupt in response to the speed pulses from the vehicle speed sensor 3 so that the speed pulses are introduced and counted up, a step 201 calculates the distance traveled from the counted value.

FIG. 2(C) shows the flow chart for computing the distance to be traveled with the residual fuel amount. More specifically, a step 300 inputs the residual fuel amount at intervals of 100 seconds. Then, a step 301 changes the previous residual amount and consumed amount. When this changing operation is completed, a step 302 determines whether the distance traveled is over 50 km. If the step 302 determines that the traveled distance is over 50 km, a step 303 performs the following calculation and obtains a gas mileage $$\frac{\text{(Traveled Distance)}}{\text{(Consumed Amount)}} = \text{Gas Mileage}.$$

On the contrary, if the step 302 determines that the distance traveled is less than 50 km, the preliminary stored gas mileage is used and the distance which can still be traveled is derived from the following calculation by a step 304

(Gas Mileage)×(Residual Fuel Amount)

After the calculation of the gas mileage by the step 303, a step 305 changes the gas mileage previously stored in the gas mileage area.

Figure 3:
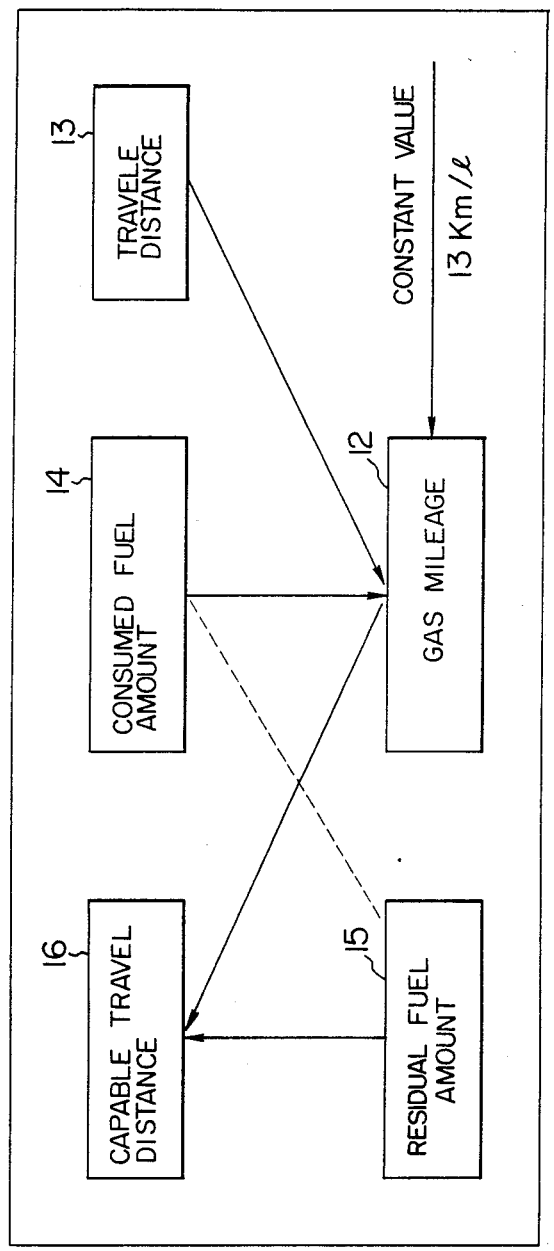
FIG. 3 is a map diagram showing the data in an RAM.

FIG. 3 shows the various areas in the memory unit RAM 9. In other words, the constant value of 13 km/l is stored in a gas mileage area 12 during the interval between the time that the microcomputer 6 is reset and the time that 50 km is traveled and it is used in the calculation of the capable travel distance. After the traveling of over 50 km, the gas mileage computed from the data in a traveled distance area 13 and a consumed fuel amount area 14 is stored in the gas mileage area 12.

Thus, in accordance with the present embodiment, a constant value is written in response to the resetting of the microcomputer and no calculation of gas mileage is performed until the distance traveled exceeds 50 km thus making it possible to correct the gas mileage at the optimum timing.

From the foregoing description it will be seen that in accordance with this invention the desired capable travel distance can be computed as a highly accurate predicted information.

We claim:

1. A trip computer for a vehicle comprising:
   first means responsive to a vehicle speed sensor for sensing the speed of the vehicle so as to detect the distance traveled by said vehicle per unit time;
   second means for sensing the residual amount of fuel remaining in the fuel tank of the vehicle; and
   a microcomputer responsive to said first means and said second means for computing the rate of fuel consumption of the vehicle as well as the distance which the vehicle is capable of traveling with said remaining fuel, including means for detecting when the vehicle has traveled a predetermined distance after the connection of said microcomputer to a power source, means for storing a predetermined value of rate of fuel consumption, and means for computing the distance which the vehicle is capable of traveling on the basis of said stored predetermined value of rate of fuel consumption until said vehicle has traveled said predetermined distance after the connection of said microcomputer to a power source and for computing said distance thereafter on the basis of the computed value of rate of fuel consumption.

2. A trip computer for displaying a possible travel distance of a vehicle on the basis of residual fuel quantity comprising:
   a vehicle speed sensor for sensing the speed of a vehicle;
   a residual fuel sensor for sensing the residual amount of fuel remaining in the fuel tank of a vehicle;
   display means responsive to a display signal for displaying a possible travel distance of said vehicle;
   a microcomputer system for receiving output signals from said sensors to generate said display signal for causing said display means to display the possible travel distance of said vehicle based on said sensed residual amount of fuel; and
   a power supply sensor for generating an output signal upon sensing the connection of a power source to said microcomputer;
   said microcomputer system including:
   a read only memory (ROM) for storing a control program;
   a random access memory (RAM) for temporarily storing necessary data;
   a central processing unit (CPU) for using the data stored in said RAM to perform computational operations in accordance with said control program stored in said ROM; and
   an input/output unit (I/O) electrically connected to said sensors for inputting the output signals from said sensors as converted data signals to said CPU and generating said display signal in accordance with an output signal from said CPU,
   whereby said microcomputer system computes the possible travel distance of said vehicle by the steps of:

setting a predetermined initial gas mileage in said RAM in response to the output signal from said power supply sensor at the time of connection of said power source to said microcomputer system;

counting speed pulses from said vehicle speed sensor for computing a distance traveled by said vehicle and storing said computed distance in said RAM;

computing said possible travel distance in accordance with said gas mileage stored in said RAM and the output signal from said residual fuel sensor;

computing an amount of fuel consumed from the output of said residual fuel sensor; and computing the gas mileage of said vehicle from said computed traveled distance and consumed fuel amount and replacing said set initial gas mileage in said RAM with said computed gas mileage only on the condition that said computed traveled distance exceeds a predetermined value.

3. A trip computer according to claim 2, wherein said microcomputer system computes said gas mileage at intervals of a predetermined period of time so as to successively replace the value of gas mileage stored in said RAM.

* * * * *